April 2, 1940.   R. W. WAGNER   2,195,908
POWER TAKE-OFF ASSEMBLY
Filed May 16, 1938
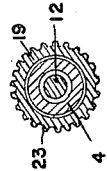
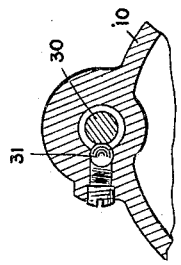
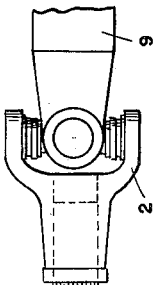
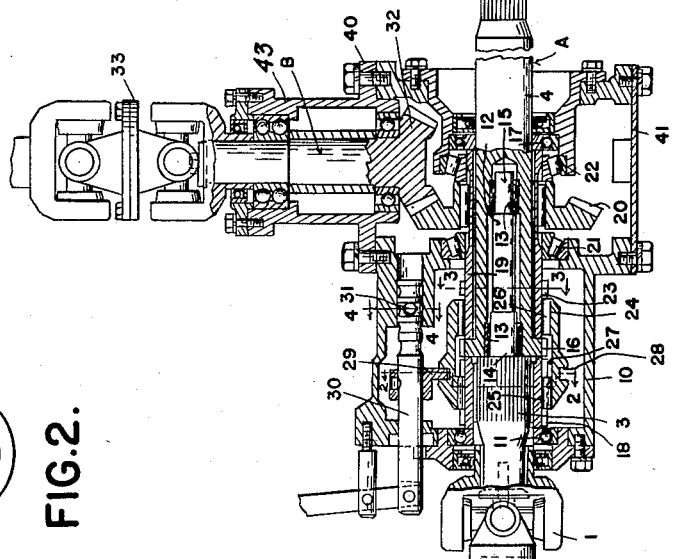
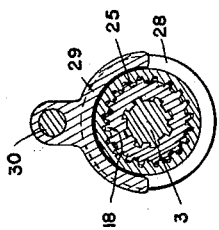
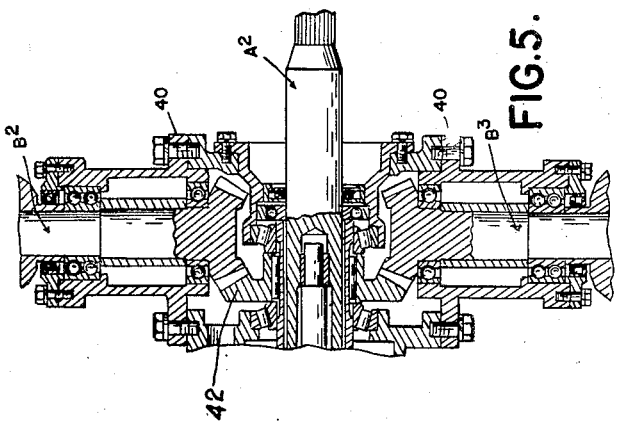
INVENTOR
ROBERT W. WAGNER
BY
ATTORNEYS Patented Apr. 2, 1940

2,195,908

UNITED STATES PATENT OFFICE 2,195,908

POWER TAKE-OFF ASSEMBLY

Robert W. Wagner, Detroit, Mich., assignor to Detroit Harvester Company, Detroit, Mich., a corporation of Michigan Application May 16, 1938, Serial No. 208,295

3 Claims. (Cl. 74—11)

This invention relates generally to power take-offs for motor vehicles and refers more particularly to a split propeller shaft power take-off for trucks.

At the present time manufacturers of trucks are using relatively short propeller shafts so that a truck of given design may be supplied to the trade in a variety of wheel bases, the arrangement being such that it is only necessary to furnish propeller shafts of different lengths according to the truck wheel base desired. Consequently, mechanical changes are reduced to a minimum. In view of this, it is possible to use split propeller shaft power take-offs in place of the short propeller shafts. However, such use is very limited due to a lack of variety and the fact that they are hard to install. Moreover, a great many changes are also necesary due to the varied equipment such power take-offs are required to drive.

In the present instance I have designed a power take-off that will meet the greatest number of requirements with the minimum number of changes for each particular use. The preferred power take-off shown is of the right angle type, i. e., the power take-off shaft projects at substantially right angles to the propeller shaft, and the assembly is designed in such a way that the power take-off shaft will not impose radial loads upon the propeller shaft.

In the accompanying drawing:

Figure 1 is a longitudinal horizontal sectional view through an assembly embodying my invention;

Figure 2 is a sectional view taken substantially on the line 2—2 of Figure 1;

Figure 3 is a sectional view taken substantially on the line 3—3 of Figure 1;

Figure 4 is a sectional view taken substantially on the line 4—4 of Figure 1;

Figure 5 is a fragmentary longitudinal section showing another modification.

Referring now to the drawing, A is the propeller shaft and B is the power take-off shaft of an assembly embodying my invention.

As shown, the propeller shaft A extends between two universal joints 1 and 2, respectively, and has two sections 3 and 4. As usual, a shaft 5 extends forwardly from the universal joint 1 to another universal joint 6 connected to a shaft 7 projecting rearwardly from the transmission 8 of an internal combustion engine (not shown), while a shaft 9 extends rearwardly from the universal joint 2 to the pinion gear of the rear axle assembly (not shown). Preferably the propeller shaft drive section 3 is provided within a suitable housing 10 with ball bearings 11 and has a reduced stepped portion 12 that is received within and extends axially of the driven section 4. Needle bearings 13 are provided about the steps 14 and 15, respectively, of the drive section 3 within the driven section 4. The driven section 4 is provided at its forward end with an integral toothed clutch member 16 and is provided intermediate its ends with ball bearings 17.

Splined upon the drive section 3 between the ball bearings 11 and the toothed clutch member 16 is a sleeve type toothed clutch member 18, while freely rotatable upon the driven section 4 between the toothed clutch member 16 and the ball bearings 17 is a power take-off sleeve 19 upon which is keyed a bevel gear 20. Encircling this sleeve 19 upon opposite sides of the bevel gear 20 are roller bearings 21 and 22, respectively, which cooperate with the ball bearings 11 and 17 to maintain the stepped portion 12 of the drive section 3 in proper axial relationship to the driven section 4. Thus, the stepped portion 12 of the drive section serves in effect as a pilot within the driven section 4. Preferably there is ample clearance between the driven section 4 and the power take-off sleeve 19 to compensate for any inaccuracies in machining which may occur and any misalignment that may occur in assembly. Thus, no binding between the parts will take place.

Formed integral with the power take-off sleeve 19 at a point between the toothed clutch member 16 and roller bearings 21 is a toothed clutch member 23 which, like the toothed clutch members 16 and 18, is adapted to be encircled by a sliding clutch collar 24. Preferably this sliding clutch collar 24 is provided interiorly thereof with integral toothed clutch members 25 and 26 and an intermediate channel or recess 27, and is provided exteriorly thereof with an annular groove or channel 28 which is engaged by a shifter fork 29 fixed upon a shaft 30 slidable longitudinally in the housing 10. As shown, the arrangement is such that clutch member 25 will always be in operative engagement with clutch member 18 and may be engaged with clutch member 16 while in engagement with clutch member 18. Clutch member 26 is adapted to be alternately engaged with clutch members 16 and 23. Any suitable means (not shown) may be employed from a remote point, for example, from the dash or instrument board of the truck for sliding shaft 30 longitudinally to cause collar 24 to be shifted longitudinally to the right or left so that the engagement of clutch members described above may be effected, while any suitable means such as the spring-pressed ball 31 may be employed to retain the shaft 30 in adjusted position.

Formed integral with the inner end of the power take-off shaft B is a bevel gear 32 that meshes with the bevel gear 20 on the driven section 4 of the propeller shaft. At the outer end of the power take-off shaft B is a universal joint 33 to which a shaft for driving equipment or mechanism (not shown) may be connected. Thus, from the foregoing it will be apparent that the assembly as shown in Figure 1 is in neutral. When the clutch collar 24 is shifted from neutral to the left so that clutch members 26 and 16 mesh, then the drive is transmitted from the drive section 3 through clutch members 18 and 25, collar 24 and clutch members 26 and 16 to the driven section 4 to propel the rear wheels (not shown) of the truck. In this position the power take-off is idle. When the collar 24 is shifted from neutral position to the right so that clutch members 26 and 23 mesh, then the drive is transmitted from the drive section 3 through clutch members 18 and 25, collar 24 and clutch members 26 and 23 to the power take-off sleeve 19, thence through the bevel gears 20 and 32 to the power take-off shaft B. In this position the power take-off only is actuated. When collar 24 is shifted further to the right from the power take-off drive position just mentioned so that clutch member 25 will mesh with clutch member 16 while clutch member 25 is meshing with clutch member 18 and clutch member 26 is meshing with clutch member 23, then the drive is transmitted from drive section 3 through clutch members 18, 25 and 16 to the driven section 4 and through clutch members 18 and 25, collar 24 and clutch members 26 and 23 to the power take-off sleeve 19. Thus, in this position both the rear wheels of the truck and the power take-off are operated simultaneously.

As shown, the bevel gears 20 and 32 provide a right angle drive from the propeller shaft section 4 to the power take-off shaft B, and the construction of the attaching flange 40 for the power take-off sub-assembly housing 43 and of the cover 41, is such that these parts are interchangeable.

In Figure 5 I have illustrated another modification in which two power take-off shafts B² and B³ extending at right angles to the propeller shaft A² are employed at diametrically opposite sides thereof. Preferably each of the power take-off shafts B² and B³ and associated parts correspond to the power take-off shaft B and associated parts, and the same type of shifting and clutch mechanism as that illustrated in Figure 1 is employed in this modification. Consequently, in this modification the shafts B² and B³ operate simultaneously when the gear 42 corresponding to gear 20 is operated. In this modification the power take-off assembly B³ takes the place of the removable cover 41 illustrated in Figure 1. In fact, the arrangement and construction of the cover 41 and of the attaching flange 40 of assembly B³ are such that they are interchangeable.

What I claim as my invention is:

1. In a power take-off assembly, a propeller shaft having two telescopically arranged sections, one being a drive section and the other a driven section, a clutch member rigid with the driven section, a clutch member non-rotatably mounted on the drive section, a power take-off sleeve freely rotatable on the driven section, a gear fixed to said power take-off sleeve, a clutch member rigid with the power take-off sleeve, a sliding clutch collar encircling the second mentioned clutch member and power take-off sleeve and provided with longitudinally spaced clutch members, one of the spaced clutch members being always in operative engagement with the second mentioned clutch member and adapted while in engagement therewith to also operatively engage with the first mentioned clutch member, the other of said spaced clutch members being between and adapted to alternately engage with the first mentioned clutch member and the third mentioned clutch member, means for sliding said collar relative to the first, second and third mentioned clutch members, and means for driving one or more power take-off shafts from the gear aforesaid.

2. In a power take-off assembly, a propeller shaft having two telescopically arranged sections, one being a drive section and the other a driven section, a clutch member fixed to the driven section, a sleeve type clutch member non-rotatably mounted on the drive section beside the first mentioned clutch member, a power take-off sleeve freely rotatable on the driven section, a gear fixed to said power take-off sleeve, a clutch member fixed to the power take-off sleeve, a sliding collar encircling the second mentioned clutch member and power take-off sleeve and provided with longitudinally spaced clutch members, one of the spaced clutch members being always in operative engagement with the second mentioned clutch member and adapted while in engagement therewith to also engage with the first mentioned clutch member, the other of said spaced clutch members being between and adapted to alternately engage with the first mentioned clutch member and the third mentioned clutch member, means for sliding said collar relative to the first, second and third mentioned clutch members, a power take-off shaft extending at substantially right angles to the propeller shaft, and a driving connection between the gear aforesaid and said power take-off shaft.

3. In a power take-off assembly, a propeller shaft having two telescopically arranged sections, one being a drive section and the other a driven section, a clutch member rigid with the driven section, a clutch member non-rotatably mounted on the drive section, a power take-off sleeve freely rotatable on the driven section, a gear fixed to said power take-off sleeve for driving a power take-off shaft, a clutch member rigid with the power take-off sleeve, a sliding collar encircling the second mentioned clutch member and power take-off sleeve and provided with longitudinally spaced clutch members, one of the spaced clutch members being always in operative engagement with the second mentioned clutch member and adapted while in engagement therewith to also engage with the first mentioned clutch member, the other of said spaced clutch members being between and adapted to alternately engage with the first mentioned clutch member and the third mentioned clutch member, means for sliding said collar relative to the first, second and third mentioned clutch members, a housing for the propeller shaft and associated clutch members provided at substatnially diametrically opposite sides of the gear with openings, and removable interchangeable closures for said openings, one of said closures including a housing for a power take-off shaft.

ROBERT W. WAGNER.